United States Patent

Kuwada et al.

[11] Patent Number: 5,916,616
[45] Date of Patent: Jun. 29, 1999

[54] PROCESS FOR PRODUCING STARCH NOODLES BY EXTRUSION

[75] Inventors: Yasuyuki Kuwada, Tokai; Takayuki Kaga, Ichinomiya; Yoshiya Kawamura, Kohnan, all of Japan

[73] Assignee: Nakano Vinegar Co., Ltd., Handa, Japan

[21] Appl. No.: 08/917,531

[22] Filed: Aug. 26, 1997

Related U.S. Application Data

[63] Continuation-in-part of application No. 08/609,700, Mar. 1, 1996, abandoned.

[30] Foreign Application Priority Data

Aug. 11, 1995 [JP] Japan ..................................... 7-205764

[51] Int. Cl.⁶ ..................................................... A23K 1/16
[52] U.S. Cl. ........................... 426/451; 426/516; 426/557
[58] Field of Search .................................. 426/557, 451, 426/516, 517, 518

[56] References Cited

U.S. PATENT DOCUMENTS

| | | | |
|---|---|---|---|
| 3,851,511 | 12/1974 | Aberg | 72/60 |
| 4,269,863 | 5/1981 | Inagami et al. | 426/557 |
| 4,422,372 | 12/1983 | Hoezee | 99/353 |
| 4,517,215 | 5/1985 | Hsu | 426/557 |
| 4,830,867 | 5/1989 | Uemura et al. | 426/557 |
| 4,960,604 | 10/1990 | Chiu et al. | 426/557 |
| 5,332,592 | 7/1994 | Ishigaki et al. | 426/451 |

FOREIGN PATENT DOCUMENTS

| | | |
|---|---|---|
| 48-45333 | 2/1973 | Japan . |
| 53-44645 | 4/1978 | Japan . |

OTHER PUBLICATIONS

K. Mori, Appln. No. 56–195974, Abs. No. 7(195): C183, Aug. 25, 1983.

K. Nakama, Appln. No. 02–285717, Abs. No. 16(466): C0989, Sep. 28, 1992.

*Primary Examiner*—Lien Tran
*Attorney, Agent, or Firm*—Pennie & Edmonds LLP

[57] ABSTRACT

A process for producing starch noodles, which comprises adding 45–55 parts by weight of hot water to 100 parts by weight of starch obtained from at least one member-selected from the group consisting of potato, sweet potato, tapioca, corn, wheat and a product thereof followed by being mixed to prepare large particles of dough and then extruding the dough under degassing at degrees of vacuum of not less than 650 Torr to produce a dough sheet. Starch noodles can be produced efficiently in simple procedures without separately preparing starch paste and without using special rollers. Further, starch noodles thus produced are highly transparent and less melted by boiling.

8 Claims, 1 Drawing Sheet

PROCESS FOR PRODUCING STARCH NOODLES BY EXTRUSION

CROSS-REFERENCE TO RELATED APPLICATIONS

This application is a continuation-in-part of application Ser. No. 08/609,700, filed Mar. 1, 1996, now abandoned.

FIELD OF THE INVENTION

The present invention relates to a process for producing starch noodles (Harusame noodles) by extrusion.

BACKGROUND OF THE INVENTION

A variety of processes are known for production of starch noodles by extrusion. For example, Japanese Patent Publication No. 4,533/1973 by the same applicant discloses a process for producing a dough sheet by mixing starch, starch paste and water to form a plastic solid mixture and then rolling it into a sheet of desired thickness. In this prior process, however, an additional process and apparatus are required for preparing the starch paste used as a part of the starting starch, resulting in troublesome procedures.

Japanese Laid-Open Patent Publication No. 44,645/1978 discloses a process for producing a dough sheet by adding hot water to starch under vigorous stirring to prepare an okara-(soybean curd lees-)like mixture and rolling it into a dough sheet through rollers. This prior art does not require the preparation of starch paste, but there is a disadvantage that special press rollers are required for forming the okara-like mixture into a dough sheet by rolling.

SUMMARY OF THE INVENTION

Hence, the object of the present invention is to provide a process for producing starch noodles without separately preparing starch paste and without using special rollers.

As a result of their eager study, the present inventors found that starch noodle dough rollable through conventional rollers can be manufactured by adding a suitable amount of hot water to starch followed by being mixed to prepare large particles of dough and then extruding the dough into a dough sheet under vacuum without separately preparing starch paste and without using special press rollers.

That is, the present invention provides a process for producing starch noodles which comprises adding 45–55 parts by weight of hot water to 100 parts by weight of starch obtained from at least one member selected from the group consisting of potato, sweet potato, tapioca, corn, wheat and a product thereof followed by being mixed to prepare large particles of dough and then extruding the dough into a dough sheet under degassing at degrees of vacuum of not less than 650 Torr.

DETAILED DESCRIPTION OF THE INVENTION

Figure 1:
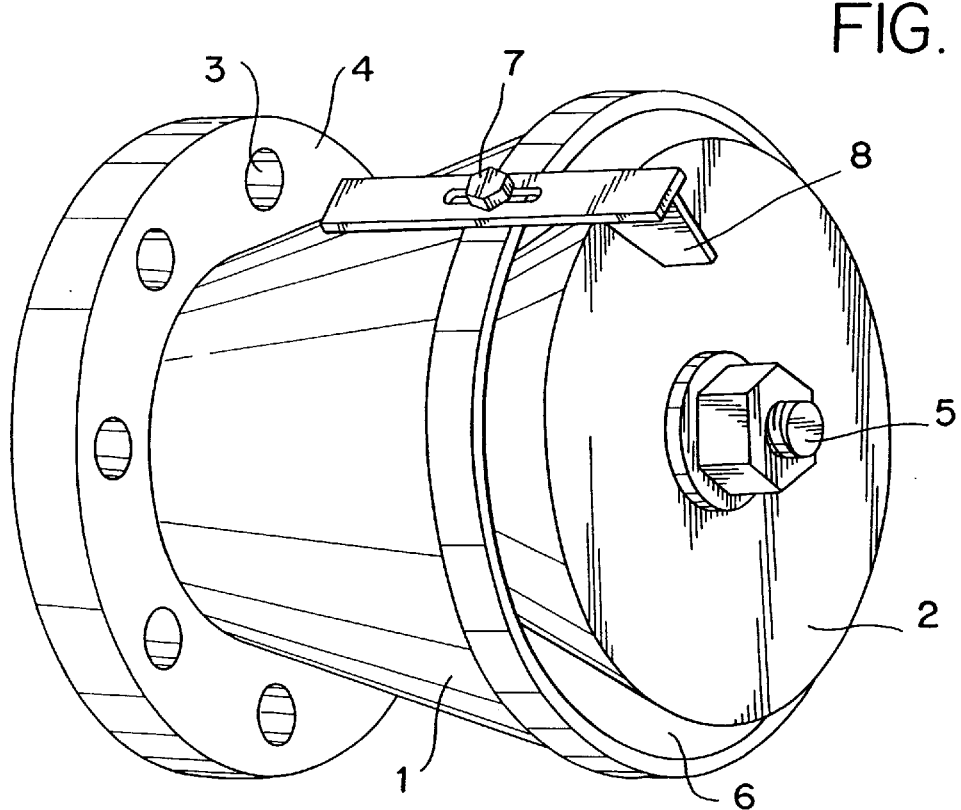
FIG. 1 is a view of the cone shaped die.

Hereinafter, the present invention is described in detail.

"Starch noodles" means herein noodle-like foodstuffs which are manufactured by using starch as the starting material, and they are well known as "Harusame", "Kuzukiri" or "Kuzukiri Harusame" in Japan. "Kuzukiri" is a Japanese traditional foodstuff manufactured by using starch (arrow root starch) as the starting material, which is collected from roots of Kudzu (*Pueraria thunbergiana Benth*). In a broader sense, however, a noodle manufactured by gelatinizing another kind of starch into a sheet and then linearly cutting and drying it is also referred to as "Kuzukiri". Hence, the term "starch noodles" as used herein means any noodle manufactured by using starch as the starting material.

In the present invention, large particles of dough are first prepared by adding hot water to starch and kneading it. The term "large particles of dough" is intended to mean those having a particle diameter of about 10 to 30 mm. The starch used in the present invention is at least one member from potato, sweet potato, tapioca, corn, wheat and a product thereof. In the above step, the large particles of dough are prepared by adding 45 to 55 parts by weight of hot water to 100 parts by weight of said starch under stirring in a mixer. The dough thus obtained is of large particle probably because starch is gelatinized upon contact with hot water to form a starch paste with which the rest of starch powder is pasted together. Adding hot water in an amount of less than 45 parts by weight results in small, hard and brittle particles of dough that cannot be formed into a dough sheet by extrusion thorough an extruder. Adding hot water in an amount of higher than 55 parts by weight results in a soft and sticky dough sheet, causing inconvenience such as adherence to a roller in the rolling step. Hot water is preferably at a temperature of not less than 90° C. Using hot water at a temperature of less than 90° C. leads to small, hard and brittle particles of dough that is formed by extrusion into a readily broken dough sheet which will cause inconvenience in the subsequent rolling step.

The large particles of dough prepared in the manner as described are then subjected to extrusion into a dough sheet in an extruder. The extrusion should be conducted under degassing at degrees of vacuum of not less than 650 Torr or otherwise the dough will not form a firm dough sheet by extrusion owing to the voids present. Further, there occurs the nonuniform distribution of the water in the dough sheet, resulting in lack of uniform transparency in starch noodles. By degassing at degrees of vacuum of not less than 650 Torr, the dough sheet can be made uniform and set firm. The apparatus used in extrusion may be any one which can be operated under degassing to extrude the dough, an example being a vacuum extruder. The large particles of dough are preferably passed through the degassing zone for a period of time of not less than 15 seconds, more preferably 25 to 45 seconds, so they can be sufficiently degassed and set firm to give an excellent dough sheet. The degrees of vacuum at the time of degassing should be 650 Torr or more. Degrees of vacuum of less than 650 Torr permit the particles of dough to form a too soft dough sheet upon extrusion, which will be troublesome in rolling and cause poor transparency for starch noodles. "Degrees of vacuum" is defined herein to mean the difference between absolute pressure and atmospheric pressure.

The extrusion die used in the extruder may be any of the conventional rectangular type die, but a preferable example is a cone shaped die (i.e. trupmet shaped die) which is provided with a cutter in the outlet. In case the rectangular die is used, the dough becomes harder to reach the end of the die as the width of the die is made larger with respect to the diameter of the screw in an extruder, and thus a wider dough sheet is difficult to produce. In case the above cone shaped die is used, however, the dough is uniformly distributed in the die. Another advantage of the cone shaped die is that because the dough extruded into a cylindrical shape through the die is cut in one position in its perimeter with the cutter, the resulting dough sheet possesses a width being equal in length to the circumference of the outlet in the die and being wider than the diameter of the screw in the extruder. Hence, such cone shaped die provided with a cutter in the outlet can be used in extrusion to improve the efficiency of the subsequent rolling step.

Figure 2:
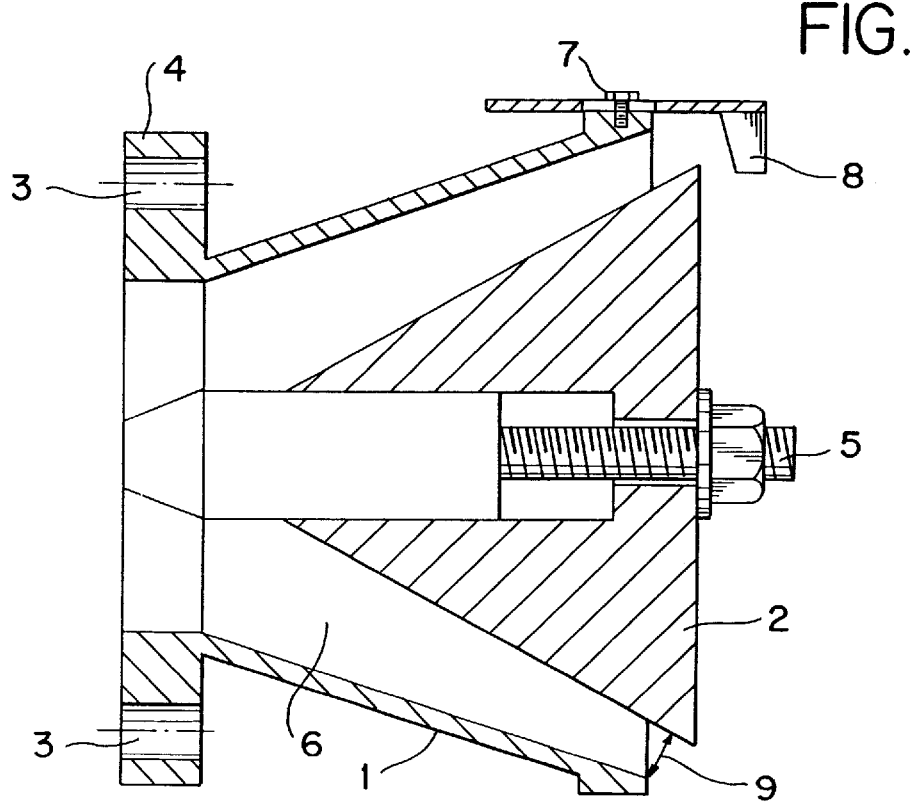
FIG. 2 is a sectional plan of the cone shaped die.

An example of the cone shaped die preferably used in the extrusion of the present invention is shown in FIGS. 1 and 2. FIG. 1 is a view of the cone shaped die. FIG. 2 is a sectional plan of the cone shaped die. The die includes the peripheral member 1 and the inside member 2. The peripheral member 1 includes flange 4 provided with a plurality of threaded holes 3. Flange 4 is fixed to an extruder with bolt etc. though the threaded holes 3. The inside member 2 is fixed to the extruder through bolt 5, and the inside member 2 is movable axially through bolt 5. The dough kneaded under degassing is extruded into a cylindrical dough sheet through the gap 6 and immediately cut into a dough sheet with cutter 8 fixed via bolt 7 to the peripheral member 1. The width of gap 9 in the outlet (and thus the thickness of the dough sheet) can be controlled by varying the position of the inside member 2. The position of cutter 8 can also be varied depending on the position of the inside member 2 by sliding the cutter through the flat hole.

The outlet of the cone shaped die should usually possess a 1- to 2-fold inner diameter that of the barrel diameter. However, the outlet of the die will usually not be required to possess an inner diameter of not less than 200 mm because the maximum width is about 600 mm with respect to the dough sheet that can be handled by the rollers. The cone shaped die can be used to extrude the dough into a dough sheet of usually 10–20 mm in thickness. This cone shaped die can be used for the production of a dough sheet about 3 times as wide as that by a rectangular die. The wider the dough sheet becomes upon extrusion, the thinner it becomes, so the number of rollers in the subsequent rolling step can be reduced to enable efficient production.

The dough sheet obtained by extrusion is rolled through a series of rollers until it reaches the desired thickness. The dough sheet according to the present invention can be rolled at a rolling ratio of as high as 80% or more through a first set of rollers because it has previously been set uniform and firm under degassing. The process of the present invention can thus reduce the number of rollers in the rolling step; for example, the dough sheet can be made 2 mm or less in thickness by rolling through a few sets of rollers.

The dough sheet thus rolled is then placed in an immersion chamber to add water to it, followed by complete gelatinization with steam in a steamer. Subsequently, it is cooled and retrograded. The dough sheet is cooled, preferably by refrigeration, although any suitable cooling means is acceptable if the dough sheet is cooled without being frozen, which would occur at approximately 0° C. The specific temperature to which the dough sheet is cooled can vary depending upon the particular dough composition. Generally, the dough sheet is cooled until it reaches a temperature just above 0° C. to about 10° C., preferably to about 1° C. to 8° C. It is also preferred to use a refrigerator capable of maintaining a substantially constant temperature while cooling, although conventional refrigerators that typically have some amount of temperature fluctuation are also suitable as long as they do not freeze the dough sheet. The retrograded dough sheet is cut linearly into noodles with a cutting roller. The noodles are dried and cut into dried starch noodles in suitable length. In the above step, the noodles should be dried to a water content of not more than 14.5% by weight, preferably 10–14.5% by weight. A water content of more than 14.5% by weight permits occurrence of mold, while a water content of less than 10% by weight causes breakage in the starch noodles during transport, which results in a decrease in the value of the product. After the immersion step, the dough sheet that was made uniform and firm under degassing can be transferred on a conveyer to be subjected successively to the above steps in series.

When the dough sheet of same thickness is processed in the apparatus of same throughput capacity, the wider the dough sheet becomes, the slower the transfer speed of the dough sheet can be made. Because a wide dough sheet can be obtained according to the process of the present invention, the transfer speed can be slowed down and thus permits a reduction in the length of apparatus relative to the processing time necessary for the respective steps including steaming, cooling, etc. This is advantageous for a reduction in the manufacturing cost of apparatus.

EFFECT OF THE INVENTION

The present invention provides a process for producing starch noodles efficiently in simple procedures without separately preparing starch paste and without using special rollers. According to the present invention, large particles of dough are prepared by adding a predetermined amount of hot water to starch, and the dough is degassed at high degrees of vacuum so that the dough can be made uniform and dense. Hence, the resulting starch noodles are highly transparent and less melted by boiling.

In addition, the uniform and dense dough can be extruded though a cone shaped die into a tight dough sheet of more uniform thickness and broader width. Hence, productivity is improved and starch noodles of significantly excellent qualities can be produced.

EXAMPLES

Example 1

25 kg of potato starch was introduced into a horizontal mixer and 12.5 kg of hot water at temperatures of 80, 85, 90 and 95° C. respectively was added to it under stirring. It was then mixed to form dough. The states of each dough thus prepared are shown in Table 1.

TABLE 1

| water temp. | states of dough |
|---|---|
| 80° C. | small particles with less gelatinization of powder, hard to be formed into a dough sheet through an extrude |
| 85° C. | small particles with less gelatinization of powder, capable of formation through an extruder into a dough sheet which however is readily broken |
| 90° C. | large particles with suitable gelatinization of powder, capable of formation into an excellent dough sheet through an extruder |
| 95° C. | large particles with suitable gelatinization of powder, capable of formation into an excellent dough sheet through an extruder |

As is evident from Table 1, large particles of dough capable of formation into a dough sheet could be obtained with hot water at a temperature of not less than 90° C.

The large particles of dough thus obtained were degassed in a vacuum extruder (inner diameter of barrel: 100 mm)

under degrees of vacuum of 0, 600, 650, 680, 720 and 750 Torr respectively and extruded into a dough sheet of 15 mm in thickness through a cone shaped die (inner dia meter of outlet: 160 mm). In the above step, the dough was passed through the degassing zone over a period of time of 40 seconds. The states of the resulting dough sheets are shown in Table 2. Each of the dough sheets was used to prepare starch noodles. The external appearance (transparency) of the starch noodles is also shown in Table 2.

TABLE 2

| degrees of vacuum | states of dough sheet | transparency of starch noodles |
| --- | --- | --- |
| no degassing | soft, not uniform and adhering to rollers | not good (opaque) |
| 600 Torr | soft, not uniform and adhering to rollers | not good (opaque) |
| 650 Torr | dough sheet set slightly firm and adhering in part to rollers | slightly not good (slightly opaque) |
| 680 Torr | dough sheet set firm and not adhering to rollers | good |
| 720 Torr | dough sheet set firm and not adhering to rollers | good |
| 750 Torr | dough sheet set firm and not adhering to rollers | good |

As is evident from Table 2, the dough sheets extruded at degrees of vacuum of less than 650 Torr are soft, not uniform and inconvenient for the rolling step. The resulting starch noodles are of poor transparency. On the other hand, the dough sheets extruded at degrees of vacuum of not less than 650 Torr are set firm and easily rollable. The results indicate that an excellent dough sheet can be manufactured for starch noodles by extrusion through a die under degassing without preparing starch paste.

Example 2

25 kg of potato starch was introduced into a horizontal mixer. 10.0, 11.25, 12.5, 13.75 and 15.0 kg of hot water at 95° C. were added respectively to it under stirring. It was then mixed to form dough. The states of each dough thus prepared are shown in Table 3.

TABLE 3

| wt. of hot water | states of dough |
| --- | --- |
| 10.0 kg | brittle small particles with less paste volume, broken when rolled |
| 11.25 kg | large particles with suitable paste volume which an be formed into an excellently rolled sheet |
| 12.5 kg | large particles with suitable paste volume which can be formed into an excellently rolled sheet |
| 13.75 kg | large particles with suitable paste volume which can be formed into an excellently rolled sheet |
| 15.0 kg | much paste volume resulting in large, soft and highly viscous particles which adhere torollers when rolled |

As can be seen from Table 3, the addition of 45–55 parts by weight of hot water relative to 100 parts by weight of starch gives excellent dough free of inconvenience at the time of rolling.

Example 3

25 kg of potato starch was introduced into a horizontal mixer, and 12.5 kg of hot water at 95° C. was added to it under stirring. The large particles of dough thus obtained were degassed in a vacuum extruder (inner diameter of barrel: 10 cm) and extruded through a cone shaped die (inner diameter of outlet: 20 cm) into a dough sheet of 20 mm in thickness and 550 mm in width. In this step, the degrees of vacuum in the vacuum extruder were in the range of 690 to 720 Torr, and the dough was passed through the degassing zone over a period of time of 40 seconds. The resulting dough sheet was rolled into a dough sheet of 3 mm thickness through the first set of rollers, then 2 mm thickness through the second set of rollers, and 1.9 mm thickness thorough the finishing rollers. The dough sheet was passed through an immersion chamber containing water at room temperature and gelatinized in a steamer at 96 to 98° C. The gelatinized dough sheet was retrograded under cooling in a refrigerator at 4° C. and cut into noodles of 2 mm in width with a cutting roller. The noodles were air-dried whereby starch noodles were obtained.

For comparison, starch noodles of the same diameter were produced from potato starch in the following conventional process. Starch slurry was prepared by adding water to a mixture of starch paste and potato starch. This starch slurry was extruded into noodles through a die provided with a plurality of holes of predetermined diameter. The noodles were treated with hot water, cooled for retrogradation, and dried to give starch noodles.

A comparison was made of melting by boiling in a pot between the starch noodles prepared in the process of the present invention and those in the conventional process. Melting by boiling was determined by measuring the time that elapsed until 5 g of the dried starch noodles moistened in 300 ml hot water at 50° C. for 3 minutes could not be caught with chopsticks by boiling in 1 L boiling water.

TABLE 4

| sample | time elapsed until starch noodles could not be caught with chopsticks |
| --- | --- |
| Starch noodles prepared in the present process | 25 minutes |
| Starch noodles prepared in the conventional process | 21 minutes |

As can be seen from Table 4, the starch noodles prepared according to the present process were less melted by boiling.

After cooked, the starch noodles prepared according to the process of the present invention possessed suitable toughness when eaten as compared with those prepared in the conventional process.

Example 4

7.5 kg of potato starch, 12.5 kg of sweet potato starch and 5 kg of corn starch were introduced into a horizontal mixer, and 13 kg of hot water at 95° C. was added to it under stirring to give large particles of dough. The dough was extruded through the same cone shaped die as in Example 3 under degassing at degrees of vacuum of not less than 680 Torr in a vacuum extruder (inner diameter of barrel: 100 mm). In the above step, the dough was passed through the degassing zone over a period of time of 40 seconds. A dough sheet of 17 mm in thickness was thus prepared. It was rolled into a dough sheet of 1.2 mm thickness through the first set of rollers and then to 1.1 mm thickness through the finishing rollers. This dough sheet was passed through an immersion chamber containing water at room temperature and gelatinized in a steamer at 96 to 98° C. The gelatinized dough sheet was retrograded under cooling in a refrigerator at 4° C.

and cut into noodles of 0.9 mm in width with a cutting roller. The noodles were air-dried to give starch noodles that were less melted by boiling.

Example 5

14.0 kg of potato starch and 6.0 kg of tapioca starch were introduced into a horizontal mixer, and 10.0 kg of hot water at 95° C. was added to it under stirring. The large particles of dough thus obtained were extruded through the same cone shaped die as Example 3 under degassing at a degree of vacuum of not less than 680 Torr in a vacuum extruder (inner diameter of barrel: 100 mm). In the above step, the dough was passed through the degassing zone over a period of time of 30 seconds. A dough sheet of 17 mm in thickness was thus obtained. It was rolled into a dough sheet of 2 mm thickness through the first set of rollers and then to 1.8 mm thickness through the finishing rollers. The dough sheet was passed through an immersion chamber containing water at room temperature and gelatinized in a steamer at 96 to 98° C. The gelatinized dough sheet was retrograded under cooling in a refrigerator at 4° C. The dough sheet was cut into noodles of 1.9 mm in width with a cutting roller. The noodles were air-dried to give starch noodles that were less melted by boiling.

Example 6

14.0 kg of potato starch and 6.0 kg of wheat starch were introduced into a horizontal mixer, and 10.0 kg of hot water at 95° C. was added to it under stirring. The large particles of dough thus obtained were extruded through the same cone shaped die as in Example 3 under degassing at degrees of vacuum of not less than 680 Torr in a vacuum extruder (inner diameter of barrel: 100 mm). In the above step, the dough was passed through the degassing zone over a period of time of 30 seconds. A dough sheet of 12 mm in thickness was thus obtained. The dough sheet was rolled into a dough sheet of 1.2 mm thickness through the first set of rollers and then 1.1 mm thickness through the finishing rollers. This dough sheet was passed through an immersion chamber containing water at room temperature and then gelatinized in a steamer at 96 to 98° C. The gelatinized dough sheet was retrograded under cooling in a refrigerator at 4° C. The dough sheet was cut into noodles of 0.9 mm in width with a utting roller. The noodles were air-dried to give starch noodles that were less melted by boiling.

Example 7

Refrigeration of Noodles Prior to Cutting

The dough sheet having approximately 1 mm thickness is pregelatinized by using steam, then cooled to the temperature listed in Table 5 below for retrograding for about 1 hour. After retrograding, the dough sheet is cut with a roll cutter to form noodles. Since the retrogradation and glutinousness of the dough sheet are correlated, the stickiness of the noodles is used as an indicator of the retrogradation of the dough sheet.

TABLE 5

| Temperature for Retro-grading (°C.) | State of the Noodles |
|---|---|
| −2 | Noodles stick together since they are still glutinous |
| 1 | Noodles do not stick together because they are not glutinous |
| 4 | Noodles do not stick together because they are not glutinous |
| 8 | Noodles do not stick together because they are not glutinous |
| 10 | Noodles stick together because the are still glutinous |

As shown in Table 5, the preferred cooling range for retrograding the dough sheet is about 1° C. to about 8° C.

What is claimed is:

1. A process for producing starch noodles which comprises:

adding 45–55 parts by weight of hot water to 100 parts by weight of a starch selected from the group consisting of potato starch, sweet potato starch, tapioca, corn starch, and wheat starch, and mixtures thereof, with mixing to prepare a dough;

degassing and extruding the dough under degrees of vacuum of not less than 650 Torr to produce a dough sheet;

gelatinizing the dough sheet with steam;

retrograding the gelatinized dough sheet by cooling the dough sheet below about 8° C. without freezing the dough sheet; and cutting the dough sheet into noodles.

2. The process according to claim 1, wherein the extruding uses a an extruder having a screw and a cone shaped extrusion die having an outlet equipped with a cutter.

3. The process according to claim 1, which further comprises rolling the dough sheet to a rolling ratio of at least 80%.

4. The process according to claim 3, which further comprises adding water to the dough sheet prior to gelatinizing and drying the cut noodles to a water content of not more than 14.5% by weight.

5. The process of claim 1, wherein the dough has large particles of about 10 to 30 mm in diameter.

6. The process of claim 2, wherein the dough sheet is wider than the diameter of the extruder screw after extruding.

7. The process of claim 3, wherein the dough sheet is rolled through a first set of rollers to produce a thinner dough sheet.

8. The process of claim 1, wherein the dough sheet is cooled to about 1° C. to 8° C.

* * * * *

UNITED STATES PATENT AND TRADEMARK OFFICE
CERTIFICATE OF CORRECTION

PATENT NO. : 5,916,616

DATED : June 29, 1999

INVENTOR(S) : Y. KUWADA

It is certified that errors appear in the above-identified patent and that said Letters Patent is hereby corrected as shown below:

Claim 1, after "uses," please delete the first occurrence of the word "a".

Signed and Sealed this

Twenty-second Day of February, 2000

Attest:

Q. TODD DICKINSON

*Attesting Officer*  *Commissioner of Patents and Trademarks*

UNITED STATES PATENT AND TRADEMARK OFFICE
CERTIFICATE OF CORRECTION

PATENT NO. : 5,916,616
DATED : June 29, 1999
INVENTOR(S) : Y. KUWADA

It is certified that error appears in the above-identified patent and that said Letters Patent is hereby corrected as shown below:

Claim 2, after "uses," please delete the first occurrence of the word "a".

This certificate supersedes Certificate of Correction issued February 22, 2000.

Signed and Sealed this

Twenty-fifth Day of April, 2000

Attest:

Q. TODD DICKINSON

*Attesting Officer*   *Director of Patents and Trademarks*